United States Patent Office 3,510,633
Patented May 5, 1970

3,510,633
DIGITAL PULSE GENERATION SYSTEM
Paul M. Kintner, Huntington Station, N.Y., assignor to Cutler-Hammer, Inc., Milwaukee, Wis., a corporation of Delaware
Filed July 1, 1966, Ser. No. 562,256
Int. Cl. G06m 3/02; H03k 29/00
U.S. Cl. 235—92                               13 Claims

ABSTRACT OF THE DISCLOSURE

A digital pulse generator affording, at a predetermined but adjustable rate of change, automatic change in the number of output pulses per unit time from one value to another selected value. It comprises an acceleration-deceleration control unit which detects the difference between a value then registered as a binary coded decimal count in a forward-backward counter and a new value as determined by settings of selector switches, and then causes the counter to bring the registered count into agreement with the selected value. Additionally it comprises a unique form of scaling control unit in which pulses generated at a fixed rate per unit time are distributed through binary coded biquinary scaling decades are interconnected through simple decoding means to the binary coded decimal count register of the forward-backward counter to provide output pulses per unit time decimally proportional to the count registered in the forward-backward counter.

---

This invention relates to a digital pulse generation system.

While not limited thereto, the present invention is particularly suited as a source of reference control pulses in a digital speed control system for electric motors.

Digital speed control systems for electric motors employ a master oscillator as a source of reference speed control pulses. Means are usually provided to adjust the rate of pulse output so that the control system can regulate to a number of desired speeds. As heretofore designed and used, none of the speed reference pulse generators have acceleration-deceleration time limit control which is often provided in analog type control systems. This has in some instances placed limitations on the use of digital type motor control systems.

It is a primary object of the present invention to provide a reference pulse generation system which not only affords selectable change in the rate of pulse output, but which also affords change from one selected rate to another selected rate at a controlled rate of change in the rate of pulse output to thereby afford time limit acceleration-deceleration type of control.

Another object of the present invention is to provide a reference pulse generation system of the aforementioned kind wherein a desired rate is preselected by selective closure of a plurality of switches, and wherein the system then automatically "homes" to and holds at the desired rate regardless of the previously preset rate and direction of change.

A still further object is to provide a reference pulse generation system of the aforementioned kind which is characterized by being all digital in form and mode of operation without need for auxiliary hand or motor operated devices other than the aforementioned selector switches, and A further and more specific object of the invention is to provide a pulse rate scaler wherein the decoding network required to convert a count registered in a binary coded decimal counter into an equivalent number of output pulses per unit time is uniquely simplified by employing a pulse scaler that generates pulses at its output terminals in a binary coded bi-quinary mode.

Other objects and advantages of the invention will hereinafter appear.

The reference pulse generating system of the present invention consists of two basic parts; an acceleration-deceleration control and a scaling control. The acceleration-deceleration control consists of a search counter, a forward-backward counter, two count coincidence units, and a programmer unit. In operation the acceleration-deceleration control functions to step the forward-backward counter at a predetermined fixed rate to a manually preselected count which in use with an electric motor control system would be indicative of a desired speed value.

The scaling control portion consists of scaling counter decades, decoders and a pulser. It functions to convert the count value held in the forward-backward counter at any time into a proportional number of output reference pulses.

It will be appreciated that in starting up an electric motor having digital control that full reference speed cannot be applied instantaneously if synchronization is to be maintained. Rather, it is desirable to start the speed reference signal at zero pulse rate and increase its rate of output pulses at a fixed rate of change. In the preferred form, hereinafter disclosed, the system has a range of 100 separate speed reference steps between zero and full speed. When a desired running speed is selected by a predetermined pattern of closure of selector switches, the acceleration-deceleration control will step the speed signal to that value when starting from zero. If the speed setting is changed while the controlled motor is running, the speed signal will be stepped toward the new value at the desired rate.

The acceleration-deceleration control detects the difference between two digital values, that is, the count registered in the forward-backward counter, and the desired count indicated by the closed selector switches, and then changes the count registered on the forward-backward counter to bring the counts registered in the two devices into agreement. In so doing, the system determines that there is a difference, detects the direction of the difference, whether positive or negative, and recognizes when there is agreement between the counts registered.

In the preferred embodiment of the acceleration control the search counter runs through its full range between each change step. If coincidence can be detected between the search counter and the forward-backward counter, as well as the selector switches, the order in which coincidence is detected indicates whether the count registered in the forward-backward counter is greater than or less than the count indicated by the selector switches. If coincidence is obtained at the same time, this means that agreement then exists between the forward-backward counter registered count and that indicated by the selector switches. In the preferred embodiment the search counter always approaches from a low to a higher count, that is, it always reaches a coincidence when proceeding from a smaller number toward a larger number.

The outputs of the coincidence units go to an acceleration-deceleration programmer which generates either a "count forward" or "count backward" pulse which is fed to the forward-backward counter to cause it to either step forward or backward one count depending upon which coincidence circuit first gives an output during a search cycle. With the occurrence of concurrent coincidence operation of the forward-backward counter is terminated. If a change in speed setting is made, the foregoing operation is carried out until simultaneous coincidences again occur.

It is the function of the scaling control portion of the system to produce a number of output pulses per unit time which is directly proportional to that which the count registered in the forward counter at any time bears to the maximum count registerable in the latter. Input pulses are generated in a fixed rate pulse generator, and the scaling decades generate pulses in accordance with a binary coded biquinary mode at a plurality of output terminals. Decoder units interposed, between the pulse output terminals of the scaling pulse control portion and count registration terminal provide gates which are activated according to the count registered in the forward-backward counter so that a proportionate number of pulses will pass through.

The latter pulses are fed into a pulse shaping section to provide a corresponding number of pulses of such shape and duration that proper speed reference action will obtain in a motor control system of the like.

The accompanying drawings illustrate a preferred embodiment of the invention which will now be described, it being understood that the embodiment is susceptible of various modifications without departing from the scope of the appended claims.

The digital time rate acceleration-deceleration control of the present invention was originally designed for use with digital speed control systems for electric motors. Motor control systems of this type are disclosed and claimed in the Strand and Kintner Pat. No. 3,331,006, issued July 11, 1967, and in the Strand Pat. No. 3,404,343, issued Oct. 1, 1968. The control of the present invention is particularly suitable for use in place of and constitutes an improvement on the "adjustable Pulse Deleter" disclosed and claimed in the last mentioned Strand application.

Figure 1:
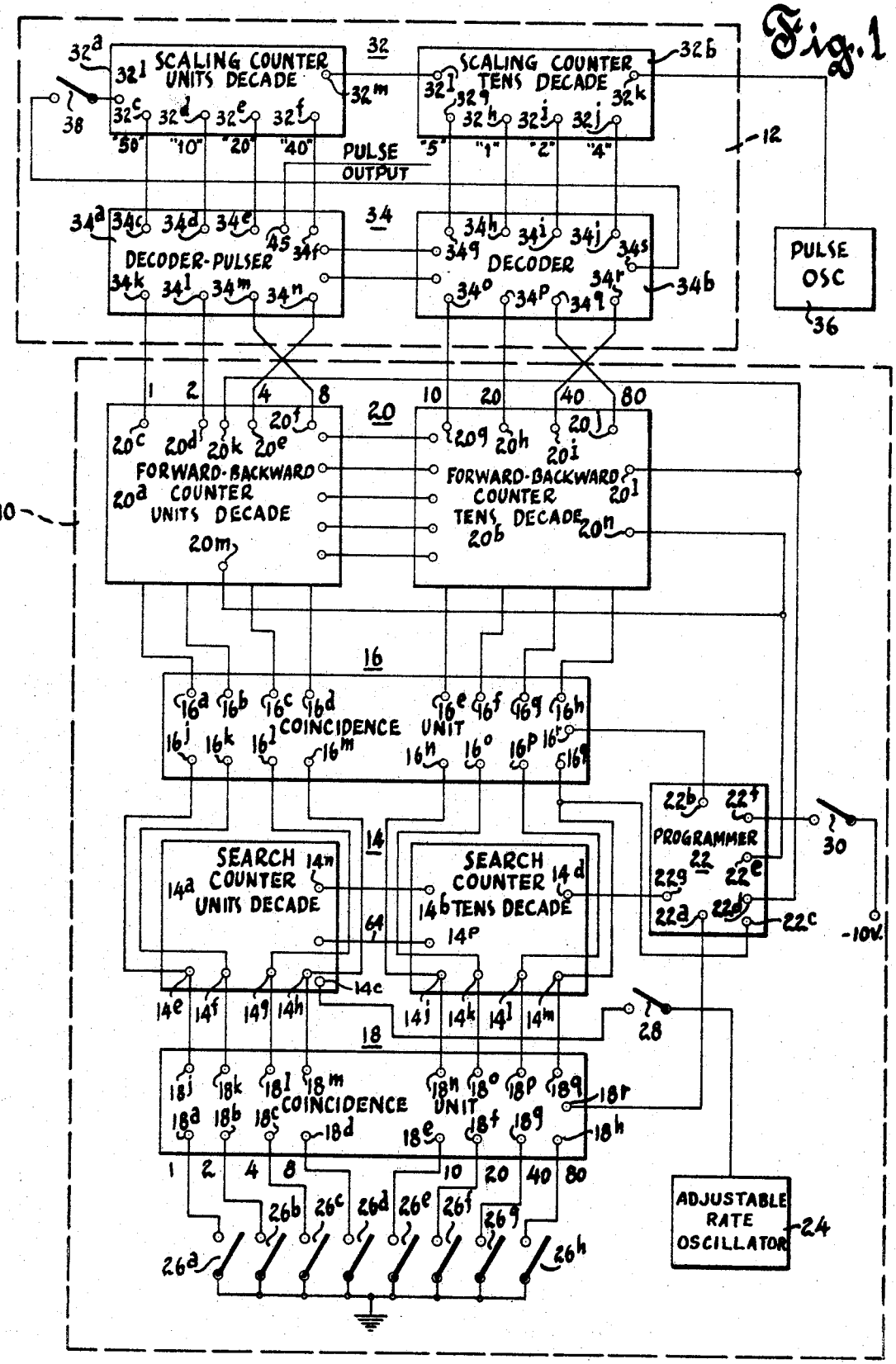
FIG. 1 is a diagrammatic showing of a pulse generator control system incorporating the invention.

The control of the present invention consists of two major portions, namely as shown within the dotted line rectangles in FIG. 1, an acceleration-deceleration control sub-assembly 10, and a scaling control, sub-assembly 12. The acceleration-deceleration control sub-assembly, hereinafter referred to as "acc-dec control" comprise a repeating cycle search counter 14 having two decade units 14$^a$ and 14$^b$, two coincidence units 16 and 18, a forward-backward, or bidirectional counter 20 having two decade units 20$^a$ and 20$^b$, a programmer unit 22, and a master adjustable rate oscillator 24.

Coincidence unit 18 has eight input terminals 18$^a$ to 18$^h$ connected respectively to an eight parallel arranged selector switch, 26$^a$ to 26$^h$, which are connected at corresponding terminals to ground. Eight other input terminals 18$^j$ to 18$^q$ of the coincidence unit 18 are connected to four output terminals of each of the decade units 14$^a$ and 14$^b$ of search counter 14. The single output terminal 18$^r$ of coincidence unit 18 is connected to an input terminal 22$^a$ of programmer unit 22.

The coincidence unit 16 has eight input terminals 16$^a$ to 16$^h$, corresponding to the first mentioned terminals 18$^a$ to 18$^h$ of unit 18 which are connected, in pairs, to output terminals 20$^e$ to 20$^l$ of decade units 20$^a$ to 20$^b$ of counter 20 and has eight other input terminals 16$^j$ to 16$^q$ connected, to the same output terminals of decade units 14$^a$ and 14$^b$ to that which terminals 18$^j$ to 18$^q$ of unit 18 are connected to counter 14. The single output terminal 16$^r$ of unit 16 is connected to input terminal 22$^b$ of programmer 22.

Search counter 14 has a count input terminal 14$^c$ in decade unit 14$^a$ connected to one contact of a switch 28 which is connected through its other stationary contact to the output terminal of oscillator 24. With switch 28 closed and oscillator 24 operating counter 14 will register a series of 99 pulses of oscillator 24 and clear to zero Decade units 14$^a$ and 14$^b$ are internally connected to provide a binary coded decimal pattern of output signals at its aforementioned output terminals and will hereinafter be described in detail in connection with FIG. 5.

Forward-backward counter 20 is a known form of bi-directional counter, and shown in FIG. 1 as comprising two decade units 20$^a$ and 20$^b$ each having four output terminals. Output terminals 20$^c$ to 20$^f$ of decade 20$^a$ provide numerical weight of 1, 2, 4 and 8 and output terminal 20$^g$ to 20$^j$ of decade 20$^h$ provide numerical weight of 10, 20, 40, 80. The decades are internally connected to provide output terminal energization in a binary coded decimal form according to the count then registered with ground potential at a terminal indicating whole or part binary coded decimal count registration.

Decades 20$^a$ and 20$^b$ both have connections through input terminals 20$^k$ and 20$^l$ to output terminal 22$^d$ of programmer 22, and they also have connections through input terminals 20$^m$ and 20$^n$, respectively, to output terminal 22$^e$ of programmer 22. It may be assumed that whenever a negative going pulse is generated at output terminal 22$^d$ of programmer 22 that counter 20 will thereby be actuated to step one count "forward" and similarly whenever the same kind of a pulse is generated at output terminal 22$^e$ that count will step one count "backward." If switches 26$^e$ and 26$^g$ are closed, indicative of desired coincidence at a count of "50," coincidence unit 18 will then provide a negative going output signal to programmer 22 whenever counter 14 registers a count of "50" in each cycle or of operation of counter 14. Programmer 22, upon receipt of each negative going input pulse from unit 18 functions to send an output pulse to decades 20$^a$ and 20$^b$ to step the forward-backward counter 20 in the "forward" count direction one count. The foregoing is repeated until the fiftieth count is registered in forward-backward counter 20.

After 50 "forward" counts have been registered in counter 20, there will be pattern correspondence in the signals upper and lower input terminals of both the coincidence units 16 and 18, corresponding to a "50" count. Accordingly, coincidence units 16 and 18 will both send negative going output pulses to programmer 22 simultaneously, and as a result the latter will send no further output pulses to counter 20 and the latter will then hold at a count of "50." As will hereinafter be explained, the count of "50" held in counter 20 causes the scaling control to put out 50 reference pulses for every 100 input pulses from a fixed pulse rate oscillator. The rate at which search counter 14 operates and the rate at which counter 20 is stepped depends upon the rate of output pulses from oscillator 24 which is adjustable.

Let it be assumed that it is desired to slow the motor down from 50 to 35% speed. Selector switches 26$^a$, 26$^c$, 26$^e$ and 26$^f$ are then closed, indicating a desired coincidence count of "35." After closure of switch 26 and after search counter 14 registers a count of 35 on its first cycle coincidence will occur in unit 18 and an output pulse is sent by the latter to input terminal 22$^a$ of programmer 22 which in turn sends an output pulse to counter 20 to cause the latter to step "backward" to a count of "49." On the next cycle of search counter 14, coincidence again occurs in coincidence unit 16 at count "49," and counter 20 is stepped back to count "48" registration. This overall cycle is repeated until counter 20 has a count of "35" registered therein. On the next following search counter cycle, both coincidence units 16 and 18 will simultaneously respond to a count of "35" registered in search counter 14 and forward-backward counter 20 to subject programmer 22 to simultaneous input pulses which prevents further stepping of counter 20.

It will be apparent from the foregoing that the acc-dec control will automatically function to step the count registered in the forward-backward counter 20 toward any new value as determined by setting of selector switches 26ª to 26ᵇ, at a timed rate and in the correct direction. It will also be observed that if the new count value is higher than that registered in counter 20 coincidence unit 16 will function on each cycle of search counter 14 to cause operation of programmer 22 in a manner that will register successive new "forward" counts in counter 20. Similarly, if a new count value is lower than that initially held in counter 20, coincidence unit 18 will function on each cycle of search counter 14 to cause operation of programmer 22 in a manner that will step counter 20 "backward" one count for each cycle of operation of search counter 14.

If switch 28 is opened during "homing" operation of the accel-decel control search counter 14 will immediately stop, and no further action will occur in either of the coincidence units 16 and 18 or in programmer 22. Consequently counter 20 will then maintain the count registered therein at the time of opening of switch 28.

Whenever there is a count registered in any flip-flop pair of either of the counters 14 and 20, it may be assumed that the output terminals thereby connected to coincidence units 16 and 18 is at ground potential (1). Conversely, whenever a count is not registered in such a flip-flop pair, it may be assumed that the output terminal aforementioned is at −10 volts (0).

Let it be assumed that the emitters connected to input terminals 16ª to 16ʰ are given the designation "A" and the base connected to terminals 16ʲ to 16ᑫ the designation "B." Now it will be apparent that any of the transistors T1 to T6 can only conduct when $A=1$ and $B=0$. Moreover, it will be apparent that whenever, at least one of such transistors conducts terminal 16R will be at ground potential. Coincidence occurs in unit 16, and likewise in unit 18, whenever any remaining previously conducting transistors go non-conducting thereby providing a negative or −10 volt potential at terminal 16R. When $A=0$ in any position, the base of a transistor going from ground to −10 volts, $B=0$, has no affect.

Figure 2:
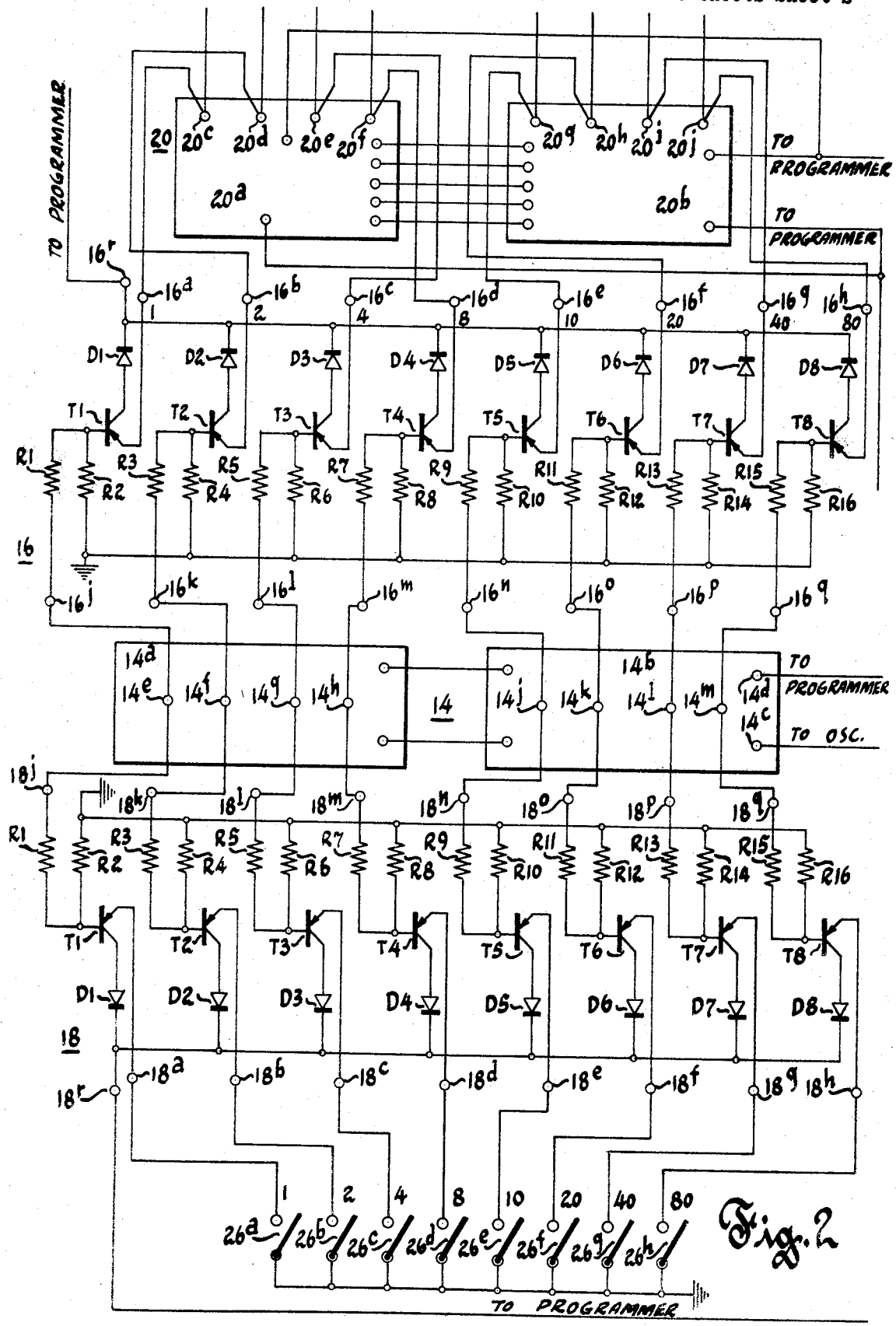
FIG. 2 shows the details of a portion of the acceleration-deceleration control in the above system.

Coincidence unit 18 as shown in FIG. 2 is exactly the same in detail as unit 16, and like elements have been given the same reference numerals. However, in unit 18 the switches 26ª to 26ʰ are connected to the emitters of transistors T1 to T8, respectively, and the bases of the latter are connected through odd numbered ones of the resistors R1 to R16 to the output terminals 14ᵉ to 14ᵐ of search counter 14.

Let it be assumed that it is desired to operate at 50% speed. Thus switches 26ᵉ and 26ᵍ which correspond to counts of "40" and "10" are closed, thereby setting "50" as the coincidence count in unit 18. Then oscillator 24 is made to operate and switch 28 is closed to set search counter 14 in operation. As counter 14 is reset at the start of its first cycle of operation coincidence will occur in unit 16 which will then impose a negative going pulse on terminal 22ᵇ of programmer 22. As will hereinafter be explained in detail, programmer 22 in turn generates a negative going pulse at its output terminal 22ᵈ to step forward-backward counter 20 to a "1" count. Although coincidence would occur in unit 18 at search counter step "50," the fact that coincidence occurred in unit 16 first in the first cycle of the search counter inhibits programmer 22 from responding to the following coincidence pulse generated in unit 18.

The aforedescribed action repeats at successively later count steps of search counter 14 through its forty-ninth cycle. By then forward-backward counter 20 will have been stepped forward "49" counts and accordingly output terminals 20ᶜ, 20ᶠ and 20ⁱ will be connected to ground. Now when search counter 14 goes into its fiftieth cycle, coincidence occurs simultaneously in units 16 and 18, and accordingly terminals 22ª and 22ᵇ of programmer 22 are subjected simultaneously to negative going pulses. This results in an inhibiting action in programmer 22, as will be later explained in detail, and no stepping pulse is sent to counter 20. Thus the "50" count attained in counter 20 will be held constant until the switches 26ª and 26ʰ are given a new pattern of closure.

Now assume switches 26ª and 26ʰ are given a new setting to provide a desired count of "75." As the new setting of "75" is higher than the count of "50" then registered in forward-backward counter 20, coincidence unit 16 will increase its count registration on the next 24 cycles of operation of search counter 14 until a count of "74" is registered in counter 20. On the twenty-fifth cycle of counter 14, coincidence occurs in both coincidence units when the search counter attains count step 75 and the count of "75" registered in counter 20 will be maintained.

Now assume that it is desired to hange the count registered in counter 20 from "75" to "34." To initiate the change, switches 26ᶜ, 26ᵉ and 26ᶠ would be closed. Thus search counter 14 will again run and on its first cycle coincidence will occur in unit 18 at count step 34 and a negative pulse will be imposed at terminal 22ª of programmer 22, and the latter then functions to cause a backward stepping of counter 20 to a count of "74." The foregoing action is repeated for the next 39 steps until the counter 20 has stepped back to a count of "35." On the next cycle of search counter 14, coincidence will occur in units 16 and 18 simultaneously, and a count of "34" held in forward-backward counter 20.

Return to zero count in counter 20 can either be effected by opening any of the then closed switches 26ª to 26ʰ or alternatively by closure of zero speed switch 30. If the former is done, the action will be as last above described. If switch 30 is closed, any effect of coincidence units 16 and 18 on programmer 22 will be inhibited and the latter acts to step counter 20 backward one step on each cycle of search counter 14 until no count remains. So long as switch 30 remains closed, programmer 22 will be inoperative to step counter 20 in the forward direction.

Figure 5:
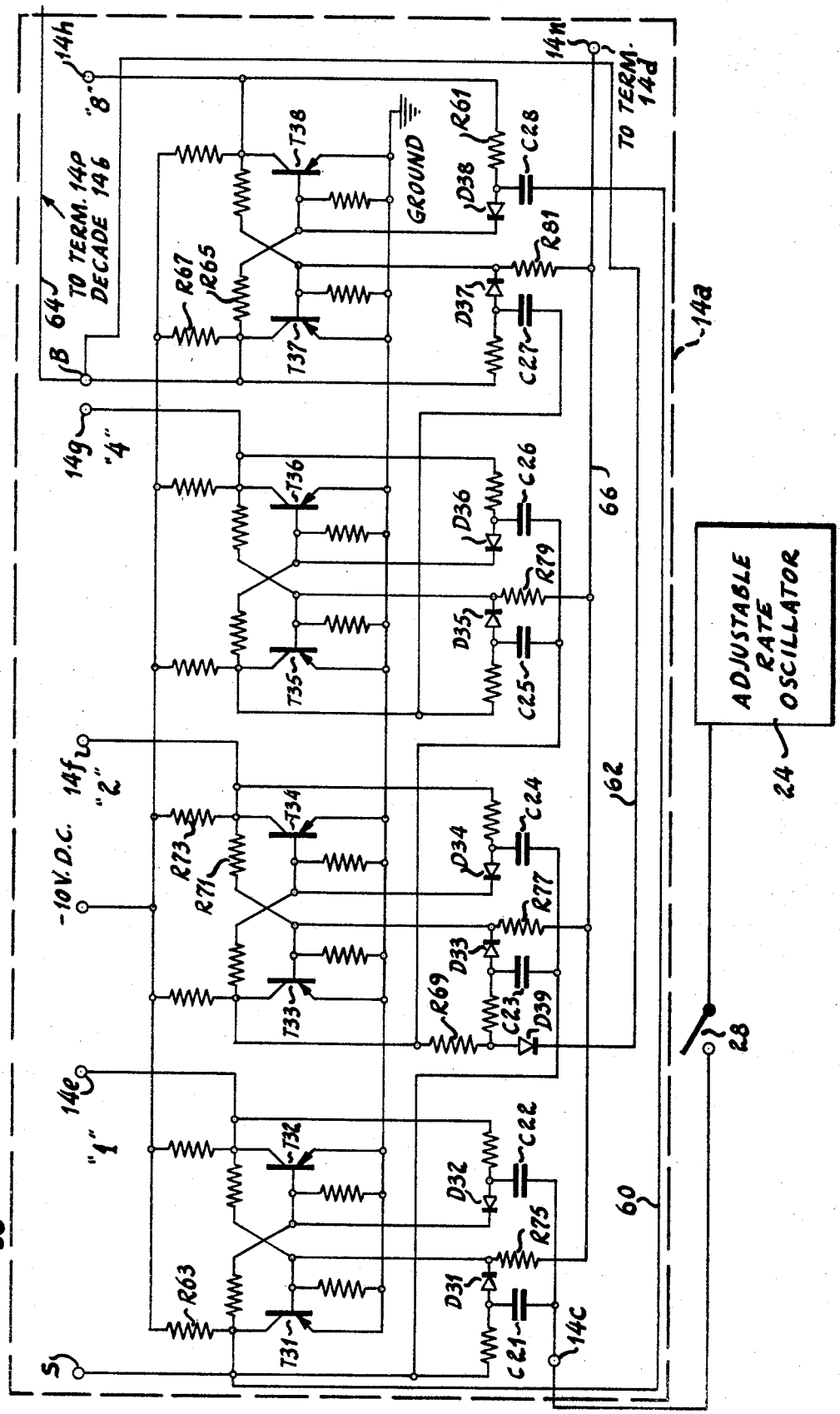
FIG. 5 shows the details of a binary coded decimal counter which forms part of the acceleration-deceleration control.

The counter decades 14ª and 14ᵇ shown in detail in FIG. 5 are similar to binary counter decades shown in the aforementioned Strand and Kintner Pat. No. 3,331,006, but modified to register counts in a binary coded decimal mode. Only decade 14ª is shown in detail as decade 14ᵇ internally is an exact duplicate of 14ª. Generally considered it comprises four transistor pairs T31–T32, T33–T34, T35–T36 and T37–T38 which are connected in "flip-flop" arrangements to provide count register signals at its output terminals 14ᵉ to 14ᶠ in the binary coded decimal mode. Starting with transistor pair T31–T32, each flip-flop pair of transistors to the right thereof successively "toggles" at half the count frequency of a pair immediately to the left in response to the first nine count input pulses in each series of 10 impressed on its terminal 14ᶜ. This is of course according to the conventional binary code of counting.

With a count of "9" being registered it will be apparent that T32 and T38 will be conducting and T34 and T36 will be non-conducting to provide a 1 0 0 1 binary code registration at terminals 14ᵉ–14ʰ. It will be observed that as T31 will then be non-conducting that capacitor C28 will be charged by current flowing from the collector of T38 through resistor R61, into and out of capacitor C28, and through conductor 60 and resistor R63 to −10 volts. When the 10th pulse in each series of 10 is impressed on terminal 14ᶜ, T31 again becomes conducting and T32 becomes non-conducting. Due to collector of T31 being shifted suddenly from −10 volts to ground potential capacitor 28 is subjected through conductor 60 to a sharp increase in potential on its lower plate which causes a sudden current flow through diode D38 and resistors R65 and R67. Consequently the potential of the base of T38 correspondingly rises to a value rendering it non-conducting followed by conduction of T37.

It will be noted that the collector of T33 is connected in series with a resistor R69, diode 39 and a conductor 62 to the collector of T37. Thus whenever T37 is non-conducting (such as occurs upon completion of the 8th and 9th pulses in a series of 10) current will flow from the collector of T33 through resistor R69, diode D39, conductor 69 and resistor R67 to −10 volts. Such current flow prevents capacitor C23 from charging.

When T31 becomes conducting upon completion of the 10th count input pulse in each series of 10 no sharp current flow from capacitor C23 will occur through diode D33 and resistors R71 and R73 to −10 volts, as capacitor C23 has no initial charge. Accordingly T33 will remain conducting and T34 non-conducting upon completion of such 10th count input pulse. It will be observed that transistors T31, T33, T35 and T37 will then be all conducting to provide a 0 0 0 0 binary coded decimal count registration at output terminals 14e–14h.

When T37 becomes conducting as a result of registration of the 10th input pulse as hereinbefore described current flows from its collector through a conductor 64 to pulse input terminal 14p of tens decade 14b to cause conduction of the transistor therein corresponding to T32. Thus the terminals 14j–14m will register a binary 1 0 0 0 corresponding to decimal "10."

Decade 14a has a "reset" conductor 66 connected to an input terminal 14n, and through parallel resistors R75, R77, R79, R81 to the low potential terminal of diodes D31, D33, D35 and D37 respectively. It may be assumed that terminal 14n has connections with terminal 14d of decade 14b and when such terminals are counted to −10 volts, all of the transistors T31, T33, T35 and T37 will be rendered conducting and transistors T32, T34, T36 and T38 non-conducting to reset the decade to zero count state. Such zeroing reset action occurs in decades 14a and 14b whenever the terminal 22g of programmer 22 is effectively at −10 volts, and the functioning of such decades is inhibited so long as terminal 22g remains at such potential.

Figure 3:
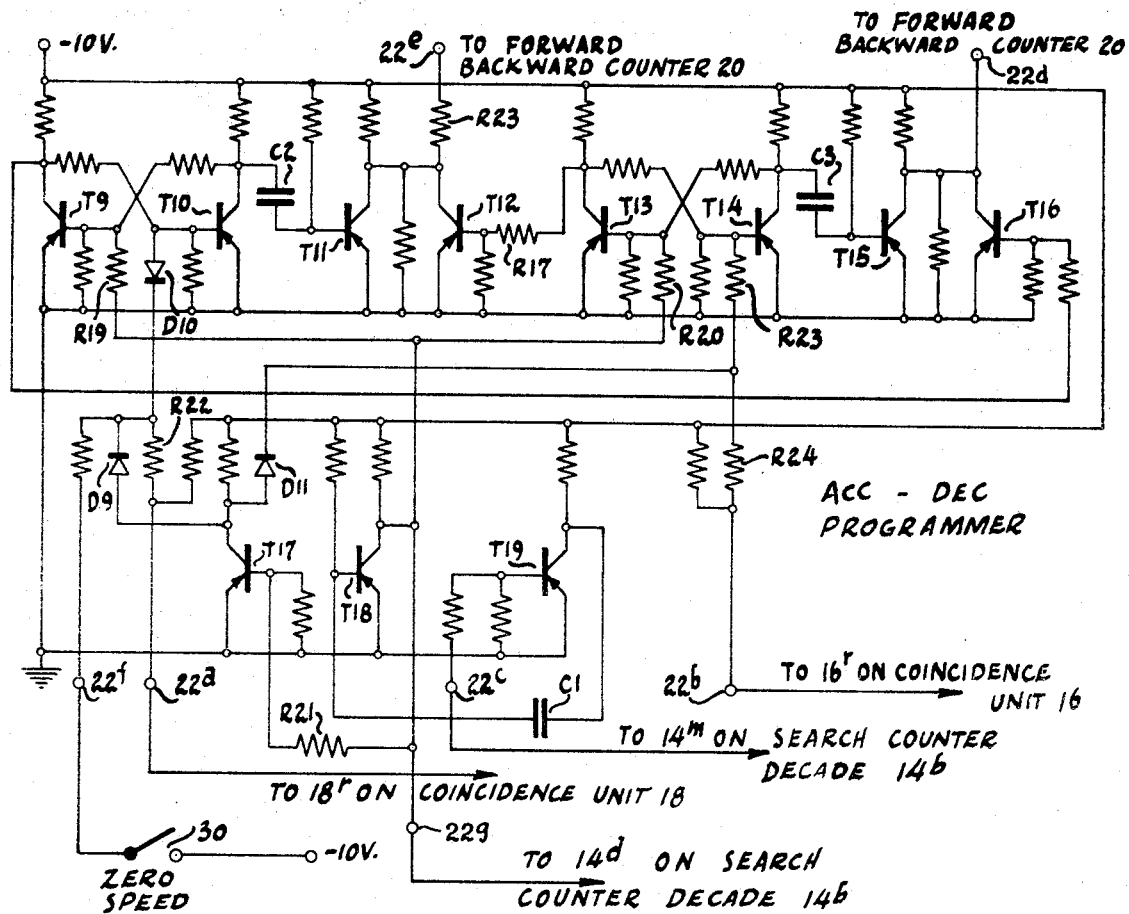
FIG. 3 shows the details of another portion of the acceleration-deceleration control.

The circuit details of programmer 22 are shown in FIG. 3. Transistors T9 and T10 form a flip-flop pair which is set by the negative going output pulse produced in coincidence unit 18 and T13 and T14 form a similar flip-flop pair which is set by a negative going pulse produced in coincidence unit 16. Transistor T11 is a pulse generator which generates a "backward" count signal to forward-backward counter 20 each time transistor T10 is rendered conducting, and similarly transistor T15 is a pulse generator generating a "forward" count signal each time transistor T14 is rendered conducting. Transistor T12 and resistor R17 form a clamping circuit which prevents a "forward" count signal from being generated whenever transistor T10 is rendered conducting, and similarly, transistor T16 and resistor R18 form a clamping circuit which prevents a "backward" count being generated whenever transistor T14 is rendered conducting.

Whenever search counter 14 attains a count of 99 in each cycle and then goes to zero, a negative going output pulse is generated at its output terminal 14m, and terminal 22c and the base of transistor T19 in programmer 22 is also subjected to such pulse. Consequently, transistor T19, which was previously non-conducting, is momentarily rendered conducting. The base of transistor T18 through its connection through capacitor C1 with the collector of T19 is thus subjected to a positive pulse which renders it momentarily non-conducting. When transistor T18 becomes non-conducting, the bases of transistors T9 and T13 through resistors R19 and R20 are connected to −10 volts which renders T9 and T13 conducting to "reset" the flip-flop pairs T9–T10 and T13–T14. The collector of T18 is also connected through output terminal 22g to input terminal 14d of search counter decade 14b, and when T18 is non-conducting it inhibits further action of counter 14 as hereinbefore described.

Transistor T17 through connection of its base in series with resistor R21 to the collector of T18 is momentarily rendered conducting whenever T18 momentarily goes non-conducting. This puts, through diodes D9 and D10, a positive bias on the base of transistor T10, and through diode D11—a similar bias is placed on the base of transistor T14, thereby preventing conduction of T10 and T14.

Now assume that a negative going pulse is thereafter received from coincidence unit 18 at input terminal 22a. Then the base of T10 through its connection in series with diode D10 and resistor R22 with terminal 22a will be biased negatively and conduction of T10 then results. When T10 becomes conducting, the base of T11 through its connection in series with a capacitor C2 to the collector T10 is subjected to a positive going pulse which renders T11 momentarily non-conducting and a negative going pulse is thereby generated at output terminal 22e which has connection with forward-backward counter 20 to provide a count "backward" step of the latter counter. Due to T13 then being conducting, the base of T12, through its connection in series with resistor R17 to the collector to T13, is biased positively thereby holding T12 non-conducting. Therefore, clamping action by T12 is disabled.

It will be seen that with T9 non-conducting under the last recited conditions that the base of T16 through its connections in series with resistor R18 will be biased negatively thereby rendering T16 conducting. When T16 is conducting, its collector will be at essentially ground potential thereby clamping the collector of T15 to the same potential. Accordingly, T15 collector cannot be shifted to a negative potential whenever T9 is non-conducting, thereby preventing a negative going "forward" count pulse being generated at output terminal 22d.

If a negative going pulse is received from coincidence unit 16 at input terminal 22b following "reset" of flip-flop pairs T9–T10 and T13–T14, the base of T14 through its connection in series with resistors R23 and R24 to terminal 22b is biased negatively. Thus 14 is made conducting and T13 non-conducting. T14 in going conducting generates a positive pulse at its collector which through its connection in series with a capacitor C3 to the base of T15 momentarily biases the latter positively. Consequently T15 is momentarily rendered non-conducting, and a negative going pulse is generated at its collector. Output terminal 22d through its connection to the collector of T15 is subjected to the same negative going pulse, and a "forward" count signal is accordingly sent to counter 20.

During the last mentioned action, T9 is conducting thereby biasing the base of T16 positively so that the latter is disabled against providing clamping action. On the other hand, T14 is then non-conducting thereby rendering T12 conducting to clamp the collector of T11 at essentially ground potential. Thus, generation of a negative going pulse at output terminal 22c is inhibited.

Now consider the case when the count registered in forward-backward counter 20 and the count setting of switches 26a to 26h are coincident in value. In this situation, negative going pulses will be generated at input terminals 22a and 22b simultaneously. Consequently T10 and T14 will both be rendered conducting simultaneously and T9 and T13 turned off. Thus both T12 and T16 will be rendered conducting to clamp the collectors of 11 and T15 to ground, thereby preventing negative going count signals from being generated at either of the output terminals 22d and 22e.

Special cases occur whenever either or both the count registered in forward-backward counter 20 is zero, or when all selector switches 26a to 26h are open indicating zero speed. In either case the transistors in coincidence units 16 and 18 will be non-conducting, thereby subjecting one or the other of the input terminals to −10 volts potential, which is an indication of coincidence. Now when search counter is reset to zero the −10 volts on an input terminal would tend to trigger one or the other flip-flop pair T9–T10 or T13–T14 to a conduction indicating output pulse generation at one of the output terminals $22^d$ or $22^e$. However, when search counter 14 is reset to zero, a negative going pulse is generated at input terminal $22^g$ of programmer 22. As a result, T19 is momentarily rendered conducting followed successively by T18 going non-conducting and T17 going conducting.

When T17 goes conducting its collector is at a ground potential and the bases of T10 and T14 are clamped to this potential. Thus a condition of coincidence in one of the units 16 or 18 can have no effect on programmer 22 when T17 is conducting. When the negative going clear pulse generated at terminal $22^c$ goes positive T19 goes non-conducting followed successively by T18 going conducting and T17 going non-conducting. Then a negative potential which is then imposed at one of input terminals $22^a$ and $22^b$ can cause the generation of a negative going output pulse at one of the output terminals $22^d$ and $22^e$ to step forward-backward counter 20 one count either forward or backward as the case might be.

By closing "zero-speed" switch 30, input terminal $22^f$ of programmer 22 is connected to −10 volts and the action of concidence units 16 and 18 is overridden. Since the base of transistor 10 is then connected to −10 volts, transistor conducts continuously and a negative going "backward" count signal is generated at output terminal $22^e$ on the beginning of each cycle of search counter 14. This makes it unnecessary to reset selector switches $26a$ and $26^h$ when it is desired to step forward-backward counter 20 back to zero.

Figure 4:
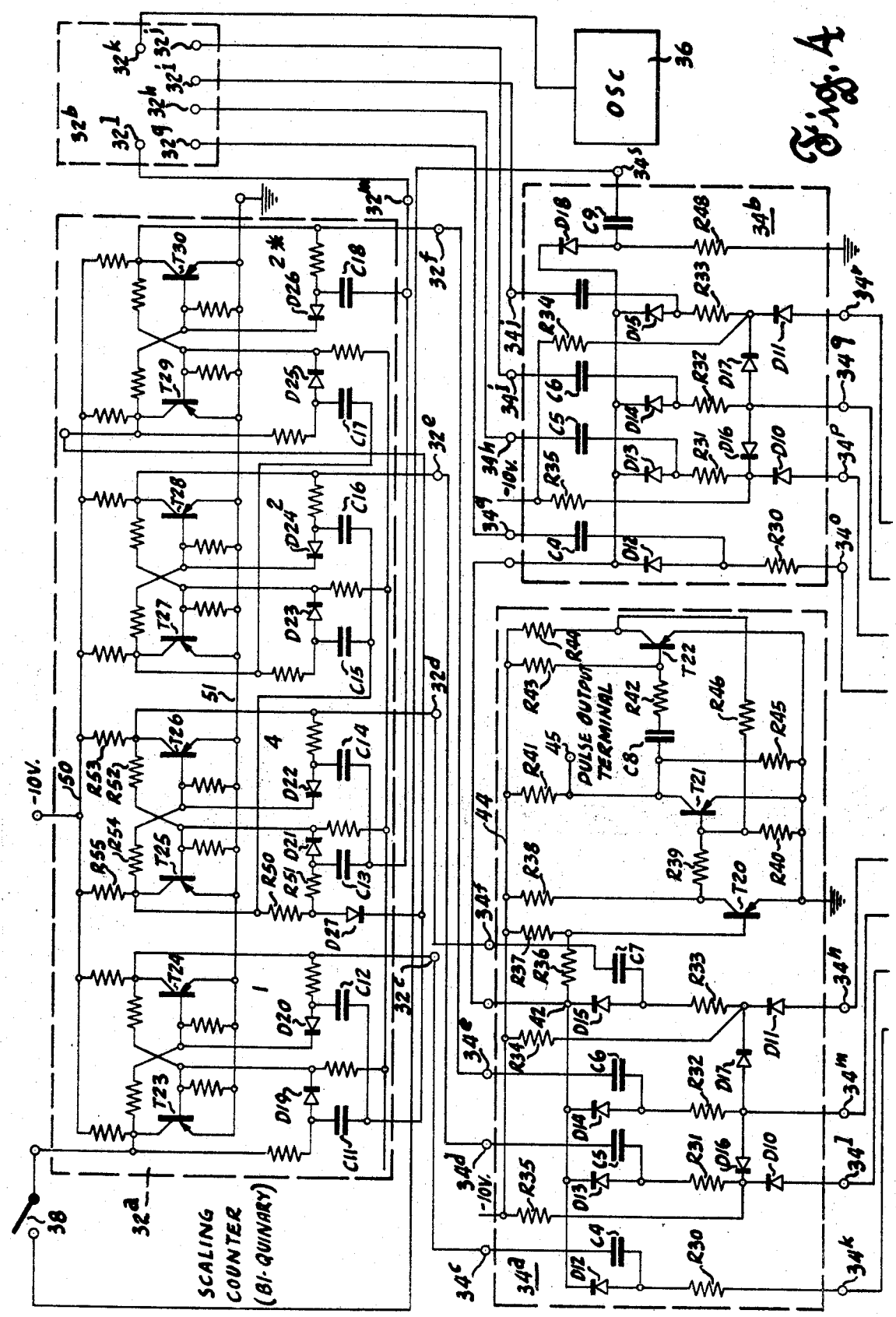
FIG. 4 shows the details of the scaling control part of the pulse generator control system.

The scaling control 12, shown schematically in FIG. 1, comprises biquinary scaling counter 32 having decade units $32^a$ and $32^b$, a decoder-pulser unit $34^a$ and a decoder unit $34^b$ and a fixed frequency pulse oscillator 36. The details of these, with the exception of oscillator 36, are shown in FIG. 4.

Referring first to FIG. 1, it will be seen that scaling counter decade $32^a$ has count pulse output terminals $32^c$ to $32^f$ and decade $32^b$ similarly has count pulse output terminals $32^g$ to $32^j$. Pulse oscillator 36 has a pulse output connection to input terminal $32^k$ of decade $32^b$. As will hereinafter be explained in detail, the terminals $32^c$ to $32^f$ have the numerical weight bits, left to right, of 50, 10, 20 and 40, and these terminals when at ground potential have scaling weights of 1, 4, 2 and 2; respectively. That is, for every 100 pulses fed into scaling counter 32, the output terminal $32^c$ associated with "50" goes from −10 volts (0) to ground (1) once, the terminal $32^d$ associated with "10" goes from "0" to "1" four times, the terminal $32^e$ associated with "20" goes from "0" to "1" twice, and the terminal $32^j$ associated with "40" goes from "0" to "1" twice. Likewise in decade $32^b$, the terminal associated with the "5" bit scales 10 times, the "4" bit 40 times, the "2" bit scales 20 times and the "1" bit scales 20 times.

The decoder-pulser unit $34^a$ has input terminals $34^c$ to $34^f$ connected to terminals $32^c$ to $32^f$ of scaling counter unit $32^a$, and decoder unit $34^b$ has input terminals $34^g$ to $34^j$ connected to output terminals $32^g$ to $32^j$ of counter unit $32^b$. Decoder-Pulser unit $34^a$ has input terminals $34^k$, $34^l$, $34^m$ and $34^n$ connected to output terminals $20^c$, $20^d$, $20^f$ and $20^e$ respectively of counter 20. Likewise decoder unit $34^b$ has input terminals $34^o$, $34^p$, $34^q$ and $34^r$ connected to output terminals $20^g$, $20^h$, $20^j$ and $20^i$ respectively, numerical weights 10, 20, 80 and 40 respectively. Decoder unit $34^b$ has an output terminal $34^s$ connected in series with a single pole switch 38 to input terminal $32^l$ of scaling counter unit $32^a$, and decoder-pulser unit $34^a$ has a pulse output terminal $34^t$.

Assume that it is desired to obtain 26 output pulses for every 100 pulses generated by oscillator 36. Now if forward-backward counter 20 is set to the desired count of "26" terminals $20^d$, $20^e$ and $20^h$ of counter 20 and hence input terminals $34^l$, $34^n$ and $34^p$ of decoder-pulser $34^a$ and decoder $34^b$ will be connected to ground. As will hereinafter be explained in detail, decoder unit $34^b$ permits 20 pulses in each series of 100 pulses to scaling counter $32^b$ to pass through from output terminal $32^h$ through decoder unit $34^b$ and into the pulser section of decoder-pulse unit $34^a$ to provide a corresponding number of shaped output pulses at pulse output terminal $32^t$. With terminals $20^d$ and $20^e$ at ground in counter decade $20^a$, decoder-pulser $34^a$ acts to pass 4 pulses in each series of 100 pulses appearing at terminal $32^f$ and to pass 2 pulses on each such series appearing at terminal $32^d$ to provide a corresponding number of output pulses at terminal $32^t$.

Referring now to FIG. 4, decoder-pulser unit $34^a$ has resistors R30 and R33 connected at corresponding ends to input terminals $34^k$ to $34^n$ respectively, but with diodes D10 and D11 connected between terminals $34^l$ and $34^n$ and resistors R31 and R33 respectively. The other ends of resistors R30 to R33 are connected in series with diodes D12 to D15, respectively, to a common output point 42. Capacitors C4 to C6 are connected at corresponding terminals to input terminals $34^c$ to $34^f$, respectively, and are connected at their other terminals to the points common between resistors R30 to R33 and diodes D12 to D15. A diode D16 is connected at one end to the point common between diode D10 and resistor R31 and is connected at its other end to the point common between resistor R32 and input terminal $34^m$. A diode D17 is connected between the last mentioned common point and the point common between resistor R33 and diode D11. The last mentioned common point is connected in series with a resistor R34 to a bus 44 which is connected to −10 volts. Similarly, the point common between R31, D10 and D16 is connected in series with a resistor R35 to negative bus 44.

The components thus far described comprise a decoder for connecting the set or registered count input numerical weights 1, 2, 4 and 8 from forward-backward decade unit $20^a$ to the 1, 4, 2 and 2 scaling weights provided at the output terminals $32^c$ to $32^f$ of binary coded biquinary scaling counter unit $32^a$. Thus, with input terminal $34^k$ at ground potential, resistor R30 is positively biased so any positive going pulse appearing at input terminal $34^c$ will result in a similar pulse appearing at point 42. Any time either input terminal $34^l$ or $34^m$ is at ground, any positive pulse appearing at input terminal $34^d$ will generate a similar pulse at 42. Similarly, any time there is a pulse at $34^e$ and $34^m$ is at ground, a corresponding pulse will appear at 42, and whenever either or both $34^m$ and $34^n$ are at ground and a pulse appears at input terminal $34^f$ a pulse will appear at point 42.

In addition to the foregoing, decoder-pulser unit $34^a$ has a pulse shaping section which comprises the transistors T20, T21 and T22. The common output point 42 of the decoder section is connected in series with a resistor R36 to the base of transistor T20 which is also connected in series with a resistor R37 to negative bus 44. The collector of T20 is connected in series with resistor R38 to bus 44, and is connected in series with a resistor R39 to the base of transistor T21. The emitters of T20, T21 and T22 are all connected to ground. T21 has its base also connected to ground in series with a resistor R40 and has its collector connected in series with a resistor R41 to bus 44 and also to pulse output terminal 45. The collector of T21 is connected in series with a capacitor C8 and a resistor R42 to the base of T22. The base of T22 is connected in series with a resistor R43 to bus 44 and its collector is connected in series with a resistor R44 to bus 44. The point common between the collector of T21 and capacitor C8 is connected in series with a resistor R45, and the point common between R40 and the base of T21 is connected in series with a resistor R46.

When no positive going pulse exists at common output point 42, transistor T20 will be conducting. When T20 conducts, its collector is essentially at ground potential and accordingly the base of T21 is biased so that the latter is held non-conducting. On the other hand, due to emitter-base current flow of T22 through R43 to bus 44, T22 will then be conducting. Under these conditions the right-hand plate of capacitor C8 will be charged positively. Now let it be assumed that a positive going pulse appears at common output point 42. This will bias the base of T20 positively to render T20 non-conducting. When the collector of T20 then goes below ground potential T21 will be rendered conducting. When the collector of T21 goes to essentially ground potential, and the left-hand plate of C8 suddenly goes to ground potential thereby causing sudden flow out of the right-hand plate through resistors R42 and R43 to bus 44. The latter current flow causes the potential at the base of T22 to rise to a value rendering the latter non-conducting. The collector of T22 will then be at substantially −10 volts and through its connection in series with resistor R46 to the base of T21 will subject the latter to that potential. So long as T22 remains non-conducting, the base of T21 will be clamped to −10 volts to insure continued conduction of the latter. After a timed interval which is a function of the RC time constant of C8, R42, and R43, the voltage at the base of T22 decreases to the point where T22 becomes conducting again, and clamping action on the base of T21 removed. If T21 has previously become conducting, T21 will then immediately go non-conducting. From the foregoing, it will be appreciated that the output pulses provided at pulse output terminal 45 will have a uniform time duration to insure proper action.

The details of the scaling counter decade unit 32$^a$ are shown in FIG. 4. Generally considered, it comprises a binary counter employing four flip-flop pairs T23–T24, T25–T26 T27–T28 and T29–T30 interconnected to provide nine positive going output pulses at its terminals 32$^e$ and 32$^f$ in a binary coded biquinary mode for every 10 input pulses at its count input terminal 32$^m$. As will be understood, there will be nine count pulses appearing at input terminal 32$^m$ for every 100 pulses fed into input terminal 32$^k$ of decade 32$^b$ from terminal 32$^l$ of decade 32$^b$.

Starting from rest, let it be assumed that transistors T23, T25, T27 and T29 are all conducting and that the lower plates of capacitors C11 to C18 are at ground potential. The count pulse received from terminal 32$^l$ on the 10th of any series of 10, may be assumed to be a negative going pulse. As the pulse decays the lower plates of C13, C14 and C18 go to ground. Now as the upper plates of C13 is at ground potential a relatively high potential pulse occurs and current flows from the collector of T23 through resistors R50 and R51, diode D21 and resistors R52 and R53 to bus 50 which is at −10 volts. This raises the potential of the base of T25 to a valve rendering it non-conducting. Consequently, the collector of T25 is shifted to −10 volts and as the base of T26 is connected to the collector of T25, emitter-base current flows from ground potential bus 51 through the emitter-base circuit of T25 and resistors R54 and R55 to bus 50. This causes T26 to conduct and its collector is shifted to ground potential and a positive pulse is generated at output terminal 32$^d$.

When the next input pulse occurs at input terminal 32$^m$ (the 20th in every series of 100 into terminal 32$^k$), the diode D22-capacitor C14 gate will respond to "flop" T26 into non-conduction and T25 into conduction. Capacitor C15-diode D23 gate will then be subjected to a high potential pulse when the collector of T25 goes to ground, and as aforedescribed in connection with T25–T26, T27 will "flip" to non-conduction and T28 to conduction. On the next input pulse to 32$^m$ (the 30th in each series of 100 to terminal 32$^k$) flip-flop pair T25–T26 will be triggered to "flip" T25 non-conducting and T26 conducting again to provide another positive output pulse at terminal 32$^d$. When the fourth input pulse appears at terminal 34$^m$, both pairs T25–T26 and T27–T28 will be "flopped" whereupon T25 and T27 conduct again and T26 and T28 are non-conducting. When T27 again conducts, capacitor C17-diode D25 gate are subjected to a high potential pulse which "flips" T29 non-conducting and T30 conducting. Conduction of T30 causes a positive pulse to appear at terminal 32$^f$.

On the fifth pulse appearing at input terminal 32$^m$, T25–T26 and T29–T30 both go to "flopped" condition where T25 and T29 are rendered conducting and T26 and T30 go non-conducting. When T29 goes conducting again, capacitor C11-diode D19 gate is subjected to a high potential positive pulse which "flips" T23 non-conducting and T24 conducting. Accordingly, a positive pulse will be generated at output terminal 32$^c$.

On the next sixth through ninth pulses, the foregoing operation of flip-flop pairs T25–T26, T27–T28, and T29–T30 repeats to generate two more positive pulses at output terminal 32$^d$ and one more each at output terminals 32$^e$ and 32$^f$. On the tenth pulse all flip-flop pairs including T23–T24 "flop" to zero condition wherein T23, T25, T27 and T29 are conducting and T24, T26, T28 and T30 are all non-conducting. When T23 goes conducting again and switch 38 is closed, a high potential positive pulse will be impressed on capacitor C9-diode D18 gate to cause a positive pulse to flow from ground through resistor R40-diode D10 to common pulse point 42 in decoder-pulser 32$^a$. Thus, with switch 38 open, nine pulses out of every 100 would be passed through scaling counter decade 32$^a$, and if switch 38 is closed an extra pulse would be generated and passed through decoder 32$^b$ to the pulser section in unit 32$^a$.

Decade unit 32$^b$ of scaling counter 32 is exactly the same in detail as that aforedescribed for unit 32$^b$. However, as will be understood, out of every 100 pulses impressed at input terminal 32$^k$, 40 will be generated at terminal 32$^h$, 20 will be generated at each of the terminals 32$^i$ and 32$^j$, and 10 will be generated at terminal 32$^g$.

It will be noted that decoder 34$^b$ and the decoder network portion of decoder-pulser 34$^a$ each comprise four capacitor-diode gates and four additional diodes. In terms of logic circuit elements the capacitor diode gates each comprise an "AND" logic element, and the diode pairs D10–D16 and D11–D17 each comprise an "OR" logic element.

Let it be assumed that instead of the scaling counter decades 32$^a$ and 32$^b$ being connected to produce output pulses in the binary coded, bi-quinary scaling mode hereinbefore described, they are connected to produce output pulses in a binary coded decimal scaling mode of 1, 1, 2 and 5 pulses for each series of ten input pulses. Those skilled in the art will recognize that in this last assumed case that the decoding networks required between each of the scaling counter decades 32$^a$ and 32$^b$ and the forward-backward counter decades 20$^a$ and 20$^b$ will markedly more complex than that hereinbefore described.

The numerical weights of 1, 2, 4, 8 of the output terminals of decade 20$^a$ do not match well with the 1, 1, 2 and 5 scaling weights of the binary coded decimal scaling mode. Inspection will show that this is especially so when counts corresponding to decimal counts of "4" through "9" are registered in decade 20$^a$. It is apparent that if a binary coded decimal scaling mode were used, that a considerable number of additional logic elements would be required to afford proper conversion of these registered count values into corresponding numbers of output pulses.

It will be apparent that any conceivable form of decoding network for converting four channel count input to corresponding pulse outputs for four separate pulse channels require a minimum of four "AND" logic elements. The decoder network of the present inverter only requires two additional "OR" logic elements due to the very advantageous match between the 1, 2, 4 and 8 numerical weight of the terminals of 20$^a$ and the bi-quinary 1, 2, 2 and 4 scaling weight of scaling counter decade 32$^a$.

I claim:
1. In a pulse generating system wherein the number of output pulses per unit time and the rate of change of number per unit time can be preselected and controlled, in combination:
  (a) means for producing pulses at a predetermined rate;
  (b) pulse scaling means connected to the first mentioned means and having a plurality of output terminals providing output pulses thereat in a binary coded biquinary sequence for each series of a given number of pulses supplied by said first mentioned means;
  (c) a bidirectional pulse counter having a plurality of output terminals corresponding in number to those of said scaling means and providing count registration indication thereat in a binary coded decimal code;
  (d) means connected between the output terminals of said scaling means and said counter and responsive to the count registered in the latter to correspondingly gate the output pulses from selected ones of the output terminals of said scaling means and provide output pulses which in number per unit time is proportional to the count registered in said counter;
  (e) and means for changing the count registered in said counter in either direction between zero and a predetermined maximum, including means for preselecting a desired count and means automatically responsive to the difference between the preselected count and a count registered in said counter to cause the latter to step change its registered count at a predetermined rate in the proper direction until correspondence exists between the preselected and registered counts.

2. A pulse generating system according to claim 1, wherein said means for changing the count registered in said counter comprises, a repeating cycle counter, a plurality of selector switches, a first digital coincidence unit connected between said bidirectional and repeating cycle counters, a second digital coincidence unit connected between said repeating cycle counter and said selector switches, and a digital programmer unit connected to both of said counters and said coincidence units and responsive to the first coincidence indication in either of said coincidence units in each cycle of said repeating cycle counter to either step the bidirectional counter forward one step or backward one step depending on in which one of the coincidence units coincidence first occurs.

3. A pulse generating system according to claim 2 wherein said means for changing the count registered in said bidirectional counter further comprises a pulse oscillator whose rate of pulse output can be varied connected to and effecting operation of said repeating cycle counter at a rate corresponding to its rate of pulse output.

4. A pulse generating system according to claim 2 wherein said programmer unit includes means to inhibit response to the coincidence signal second occurring in a coincidence unit in any cycle of said repeating cycle counter and further includes means to inhibit response when coincidence occurs in either coincidence unit at zero count coincidence.

5. A pulse generating system according to claim 2 together with an auxiliary switch which when closed causes said programmer unit to step said bidirectional counter to zero count from any count previously registered.

6. A pulse generating system according to claim 1 wherein said means connected between the output terminal of said scaling means and said bidirectional counter comprises a plurality of capacitor-diode gates corresponding in number to said output terminals of said sealing means and said bidirectional counter and having their input terminals connected thereto in such a manner that the binary coded decimal indication in said bidirectional counter will cause a desired gating through of the pulses occurring at the output terminals of said scaling means so that the collective rate of pulses at the gate outputs will be directly proportional at any time to the count registered in said bidirectional counter.

7. A pulse generating system according to claim 6 wherein said means connected between said output terminals of said scaling means and said bidirectional counter further comprises a pulse shaping circuit having its input commonly connected to the outputs of said capacitor-diode gates and providing at its output terminals for each input pulse an output pulse of predetermined magnitude and duration.

8. A digital counter system comprising, in combination:
  (a) a bidirectional pulse counter;
  (b) a repeating cycle pulse counter under the direction of an adjustable rate pulse generator;
  (c) a first coincidence unit connected between the count indication terminals of both of said counters and providing an output pulse when but only when there is correspondence of count indication in both counters;
  (d) a plurality of selector switches corresponding in number to the count indication terminals of said repeating cycle counter;
  (e) a second coincidence unit connected between the count indication terminals of said repeating cycle counter and said selector switches and providing an outlet pulse when but only when there is correspondence between the count indicated by said repeating cycle counter and the pattern of closure of said selector switches;
  (f) and a programmer unit connected to the outputs of said coincidence units and having connections with both of said counters, said programmer being responsive in any cycle of the repeating cycle counter to the first output pulse from either of said coincidence units to cause said bidirectional counter to either step one step forward or one step backward according to whichever coincidence unit first produces an outlet pulse, and said programmer being responsive to simultaneous output pulses from said coincidence units to hold the count then registered in said bidirectional pulse counter.

9. A digital counter system according to claim 8 wherein said programmer unit includes means responsive to reset of said repeating cycle counter to zero to inhibit its response to any coincidence signal and prevent its advance for a predetermined time interval.

10. A digital counter system according to claim 8 wherein each of said coincidence units comprises a plurality of like transistor circuits having the outputs of their emitter-collector circuits commonly connected together, wherein the bases of the transistors in both coincidence units are connected to the count indication terminals of said repeating cycle counter wherein the emitters of the transistors in the first coincidence unit are connected to the count indication terminals of said bidirectional counter and wherein the emitters of the transistors in the second coincidence unit are connected to said selector switches.

11. A pulse rate scaler comprising, in combination,
  (a) binary coded biquinary scaling means including at least one decade of four transistor flip-flop pairs having output terminals connected to corresponding transistors of each pair and a single input terminal for connection to a source of input pulses, and means interconnected with said input terminal and said flip-flop pairs so that the numbers of 0 to 1 transistions at the output terminals will be 1, 2, 2 and 4 for each series of ten input pulses impressed on said input terminals;
  (b) counter-register means having register signal terminals corresponding in number to the output terminals of said scaling means and affording output signals thereat in a binary coded decimal mode in accordance with the count registered therein;

(c) and decoder means connected between the output and signal register terminals of said scaler and counter-register means and responsive to the signal pattern at said signal register terminals to gate the output pulses from selected ones of the output terminals of said scaling means to provide output pulses at a rate decimally proportional to the count registered in said counter-register means.

12. A pulse rate scaler according to claim 11 wherein said means connected between the output and signal register terminals of said scaling and counter-register means comprise a plurality of capacitor-diode gates corresponding in number to said sets of output and signal register terminals, wherein each such gate has a pulse input gate connected to an output terminal of said scaling means and a gate control terminal connected to a signal register terminal of said counter-register means, wherein the output terminals of said gates are commonly connected together, and wherein said gates include connections between gate control terminals of certain of said gates to provide a gating pattern such that the collective rate of pulses produced at the common output connection of said gates will be decimally proportional at any time to the count registered in said counter.

13. A pulse rate scaler according to claim 12 wherein the pulse input terminals of said capacitor-diode gates are consecutively, in one direction and order, connected to the output gates of said scaling means, wherein 1, 2, 2 and 4 pulses respectively are generated in each series of ten input pulses to said scaling means, wherein the gate control input terminals are connected to the signal register gates of said counter-register which in the corresponding direction and order, have numerical weights of 1, 2, 8 and 4 respectively, and wherein the gate control terminal of numerical weight 8, is also forwardly connected through uni-directional conducting devices to the gate control electrodes immediately adjacent thereto on both sides thereof in the last specified consecutive order.

References Cited

UNITED STATES PATENTS

| | | |
|---|---|---|
| 3,184,663 | 5/1965 | Mergler. |
| 3,364,340 | 1/1968 | McGarrell _____ 235—92 |
| 3,393,366 | 7/1968 | Shoop _____ 307—225 X |
| 3,417,303 | 12/1968 | Reuteler. |

DARYL W. COOK, Primary Examiner

L. H. BOUDREAU, Assistant Examiner

U.S. Cl. X.R.

235—150.3; 328—39

UNITED STATES PATENT OFFICE
CERTIFICATE OF CORRECTION

Patent No. 3,510,633            Dated May 5, 1970

Inventor(s) Paul M. Kintner

It is certified that error appears in the above-identified patent and that said Letters Patent are hereby corrected as shown below:

Column 6, line 22, "hange" should be -- change --.

Column 8, line 18, after "collector" insert -- of --;

line 25, change "to" to -- of --;

line 54, "T14" should be -- T13 --;

line 65, "11" should be -- T11 --.

Column 9, line 26, "10" should be -- T10 --.

Column 11, line 25, "T21" should be -- T20 --.

Column 13, line 15, "code" should be -- mode --;

line 71, "sealing" should be -- scaling --.

Column 14, line 29, "outlet" should be -- output --;

line 41, "outlet" should be -- output --.

SIGNED AND
SEALED

OCT 27 1970

(SEAL)
Attest:

Edward M. Fletcher, Jr.
Attesting Officer

WILLIAM E. SCHUYLER, JR.
Commissioner of Patents